UNITED STATES PATENT OFFICE.

WALTER E. MASLAND, OF WILMINGTON, DELAWARE, ASSIGNOR TO E. I. DU PONT DE NEMOURS POWDER COMPANY, OF WILMINGTON, DELAWARE, A CORPORATION OF NEW JERSEY.

PREPARATION OF ALCOHOL FROM CHLORHYDROCARBONS.

1,086,381.      Specification of Letters Patent.      Patented Feb. 10, 1914.

No Drawing.      Application filed October 11, 1912. Serial No. 725,163.

*To all whom it may concern:*

Be it known that I, WALTER E. MASLAND, of Wilmington, in the county of Newcastle, and in the State of Delaware, have invented certain new and useful Improvements in Preparation of Alcohols from Chlorhydrocarbons, and do hereby declare that the following is a full, clear, and exact description thereof.

My invention relates particularly to the production of alcohols, and especially alcohols of the monohydric paraffin alcohol series. It is, however, applicable to the production of alcohols of many other kinds.

My invention has special reference to the production of alcohols from chlorhydrocarbons, but it is to be understood that it may be applied to the production of alcohols from many other halogen derivatives of organic compounds.

In carrying out my invention, I use as a reagent a compound such, for example, as one of the oxids or hydroxids of the heavy metals, but I have found that zinc oxid gives much higher yields and that its use is more advantageous than other compounds. In the case where zinc oxid is used, zinc chlorid is a by-product, and this is a valuable commercial commodity. I have discovered, however, that instead of zinc oxid, lead oxid or caustic soda may be used with advantageous results. Furthermore, in the place of the oxids and hydroxids, I have discovered that sodium carbonate may be used.

While my invention is applicable to the treatment of many different halogen derivatives of organic compounds, I have found it especially applicable to the treatment of amyl and hexyl chlorids. Amyl and hexyl chlorids which may be used for this purpose may be obtained by fractionation of a hydrocarbon mixture such as gasolene; the chlorination of the pentanes and hexanes to produce monochlorhydrocarbons; the acetylation of the same with acetic acid and sodium or potassium acetate; the recovery of the olefins thus produced by distillation; and the separation of these olefins by obtaining the chlorolefins which are formed by the action of moderately strong hydrochloric acid at a comparatively low temperature, upon the mixture of olefins. The chlorhydrocarbons thus obtained may be then mixed with several volumes of water and enough zinc oxid to react with all of the chlorin present in the chlorhydrocarbons, the mixture being kept preferably at a boiling temperature for several days. In the case of amyl chlorid, the reaction is as follows:

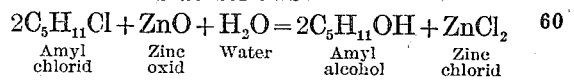

$$2C_5H_{11}Cl + ZnO + H_2O = 2C_5H_{11}OH + ZnCl_2$$
Amyl chlorid   Zinc oxid   Water   Amyl alcohol   Zinc chlorid The reaction having been completed, the alcohols are recovered by distillation and the residual liquid is evaporated to any desired degree found advantageous for disposing of the zinc chlorid which it contains.

In carrying out this process it will be found that some olefins are formed as by-products. These may be used over again to produce alcohols, or in any other desired manner. The alcohols thus obtained are valuable commercially in many ways, and it has been found that they are particularly valuable as a substitute for refined fusel oil. In fact, these alcohols may be used in the various industries in almost every case where refined fusel oil is used. Among other uses that may be mentioned, these alcohols have been found to be of considerable value when used with solvents and non-solvents for nitrocellulose.

While I have described my invention above in detail, I wish it to be understood that many changes may be made therein without departing from the spirit thereof.

I claim:

1. The process which comprises treating a halogen derivative of a hydrocarbon containing an alkyl group, to which latter the halogen is attached, with zinc oxid to transform the same into an alcohol.

2. The process which comprises treating a halogen derivative of an aliphatic hydrocarbon with zinc oxid to transform the same into an alcohol.

3. The process which comprises treating a halogen derivative of a saturated aliphatic hydrocarbon with zinc oxid to transform the same into an alcohol.

4. The process which comprises treating a halogen derivative of a hydrocarbon of the paraffin series with zinc oxid to transform same into an alcohol.

5. The process which comprises treating a mono-halogen derivative of a hydrocarbon of the paraffin series with zinc oxid to transform the same into an alcohol.

6. The process which comprises treating a chlorin derivative of a hydrocarbon containing an alkyl group, to which latter the chlorin is attached, with zinc oxid to transform the chlorin derivative into an alcohol.

7. The process which comprises treating a chlorin derivative of an aliphatic hydrocarbon with zinc oxid to transform the same into an alcohol.

8. The process which comprises treating a chlorin derivative of a saturated aliphatic hydrocarbon with zinc oxid to transform the same into an alcohol.

9. The process which comprises treating a chlorin derivative of a hydrocarbon of the paraffin series with zinc oxid to transform the same into an alcohol.

10. The process which comprises treating a mono-chlorhydrocarbon of the paraffin series with zinc oxid to transform the same into an alcohol.

11. The process which comprises treating a mono-halogen derivative of a hydrocarbon of the paraffin series with zinc oxid to transform the same into an alcohol and then separating the alcohol from the zinc chlorid solution and evaporating the latter.

12. The process which comprises treating a mono-chlorhydrocarbon of the paraffin series with zinc oxid to transform the same into an alcohol, then separating the alcohol from the zinc chlorid solution and evaporating the latter.

13. The process which comprises treating a saturated chlorhydrocarbon with zinc oxid to transform the same into an alcohol.

14. The process which comprises treating a saturated chlorhydrocarbon with zinc oxid to transform the same into an alcohol, then separating the alcohol from the zinc chlorid solution and evaporating the latter.

In testimony that I claim the foregoing I have hereunto set my hand.

WALTER E. MASLAND.

Witnesses:
C. R. MUDGE,
A. M. GORMAN.